(12) United States Patent
Molander et al.

(10) Patent No.: US 8,970,401 B2
(45) Date of Patent: Mar. 3, 2015

(54) USING IMAGE SENSOR AND TRACKING FILTER TIME-TO-GO TO AVOID MID-AIR COLLISIONS

(75) Inventors: Sören Molander, Linköping (SE); Jimmy Jonsson, Linköping (SE)

(73) Assignee: SAAB AB, Linköping (SE)

( * ) Notice: Subject to any disclaimer, the term of this patent is extended or adjusted under 35 U.S.C. 154(b) by 370 days.

(21) Appl. No.: 13/061,192

(22) PCT Filed: Aug. 12, 2009

(86) PCT No.: PCT/SE2009/050931
§ 371 (c)(1),
(2), (4) Date: May 5, 2011

(87) PCT Pub. No.: WO2010/024751
PCT Pub. Date: Mar. 4, 2010

(65) Prior Publication Data
US 2011/0210872 A1 Sep. 1, 2011

(30) Foreign Application Priority Data
Aug. 27, 2008 (EP) .................... 08163084

(51) Int. Cl.
*G08G 5/04* (2006.01)
*G06F 17/10* (2006.01)
(Continued)

(52) U.S. Cl.
CPC . *G01S 11/12* (2013.01); *G01S 5/16* (2013.01); *G01S 3/7864* (2013.01); *G08G 5/045* (2013.01)
USPC .......................................... 340/961; 701/301

(58) Field of Classification Search
CPC ............................ G08G 5/0069; G08G 5/0078
USPC .................. 340/961, 963, 990, 980; 364/461, 364/424.06, 449; 342/29, 32, 64
See application file for complete search history.

(56) References Cited

U.S. PATENT DOCUMENTS 5,128,874 A * 7/1992 Bhanu et al. .................. 701/301
5,448,233 A * 9/1995 Saban et al. .................. 340/963
(Continued)

FOREIGN PATENT DOCUMENTS

EP 1990772 A2 11/2008
EP 2037408 A1 3/2009
EP 2071515 A1 6/2009

OTHER PUBLICATIONS

G. Fasano et al; "Airborne Multisensor Tracking for Autonomous Collision Avoidance", 9th Annual International Conference On Information Fusion, IEEE, Jul. 1, 2006; pp. 1-7.
(Continued)

*Primary Examiner* — Brian Zimmerman
*Assistant Examiner* — Thomas McCormack
(74) *Attorney, Agent, or Firm* — Venable LLP; Eric J. Franklin; Jeffri A. Kaminski

(57) ABSTRACT

A collision avoidance system for deciding whether an autonomous avoidance maneuver should be performed in order to avoid a mid-air collision between a host aerial vehicle equipped with the system and an intruding aerial vehicle. At least one electro-optical sensor captures consecutive images of an intruding vehicle such that the vehicle manifests itself as a target point in the images. An image processor estimates the azimuth angle, elevation angle and a first time-to-collision estimate of the time to collision between the host vehicle and the intruding vehicle. The first time-to-collision estimate is estimated based on scale change in the target point between at least two of said consecutive images. A tracking filter is arranged to estimate a second time-to-collision estimate using the azimuth angle, the elevation angle and the first time-to-collision estimate estimated by the image processor as input parameters. A collision avoidance module is arranged to decide whether or not an avoidance maneuver should be performed based on any of at least one parameter, of which at least one is indicative of said second time-to-collision estimate.

13 Claims, 8 Drawing Sheets

(51) Int. Cl.
*G01S 11/12* (2006.01)
*G01S 5/16* (2006.01)
*G01S 3/786* (2006.01)

(56) References Cited

U.S. PATENT DOCUMENTS

| | | | |
|---|---|---|---|
| 6,975,246 B1 * | 12/2005 | Trudeau | 340/903 |
| 7,061,401 B2 * | 6/2006 | Voos et al. | 340/961 |
| 2002/0033818 A1 | 3/2002 | Lin | |
| 2004/0252863 A1 | 12/2004 | Chang et al. | |
| 2007/0210953 A1 | 9/2007 | Abraham et al. | |
| 2008/0033649 A1 | 2/2008 | Hasegawa et al. | |

OTHER PUBLICATIONS

G. Recchia et al.; "An Optical Flow Based Electro-Optical See-and-Avoid System for UAVs"; Aerospace Conference, IEEE; Mar. 3, 2007; pp. 1-9.
PCT/ISA/210—International Search Report—Dec. 1, 2009.
European Search Report—Feb. 4, 2009.
PCT/ISA/237, Written Opinion of the International Searching Authority—Dec. 1, 2009.

* cited by examiner

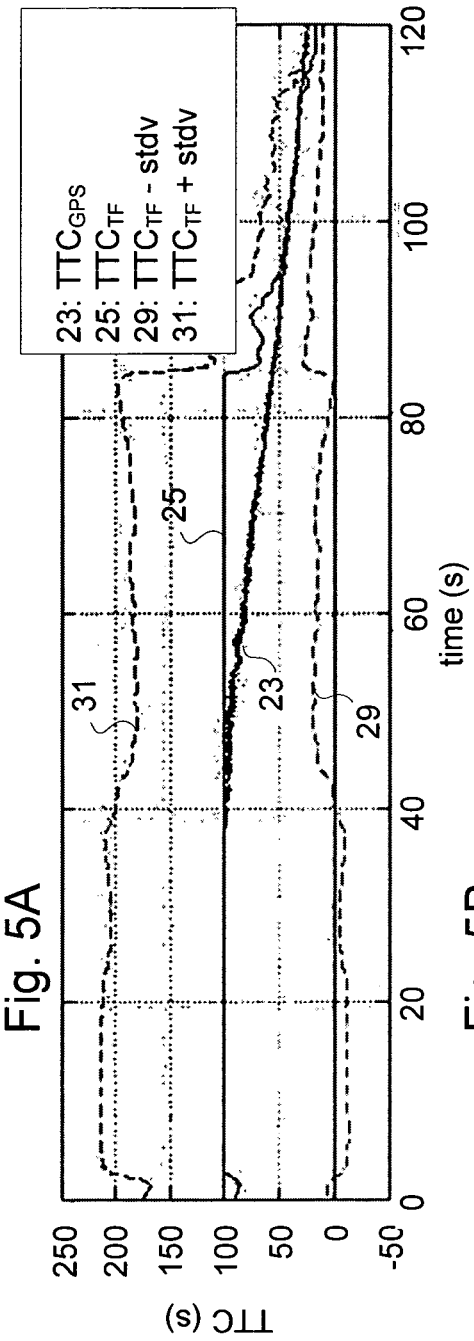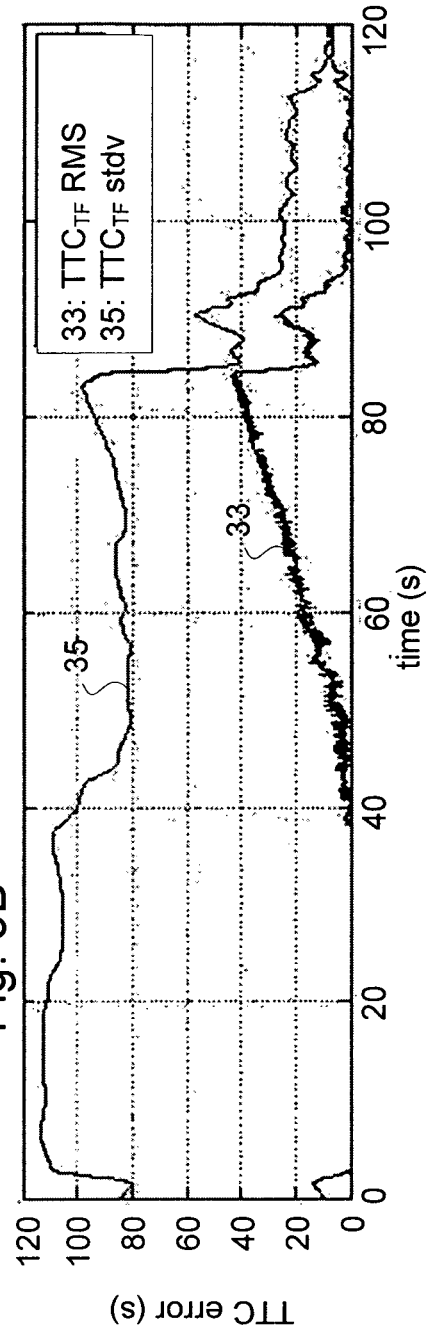
Fig. 5A
Fig. 5B

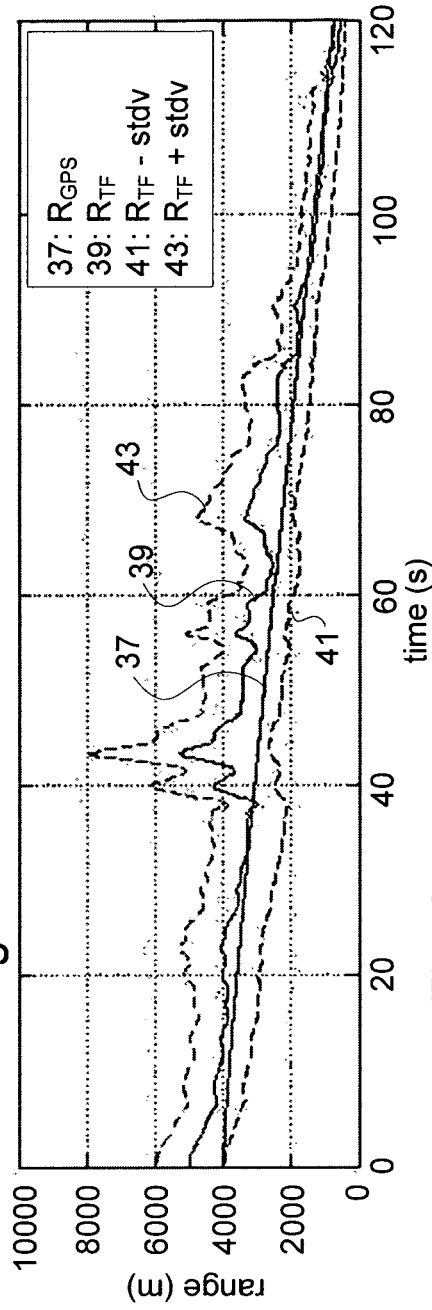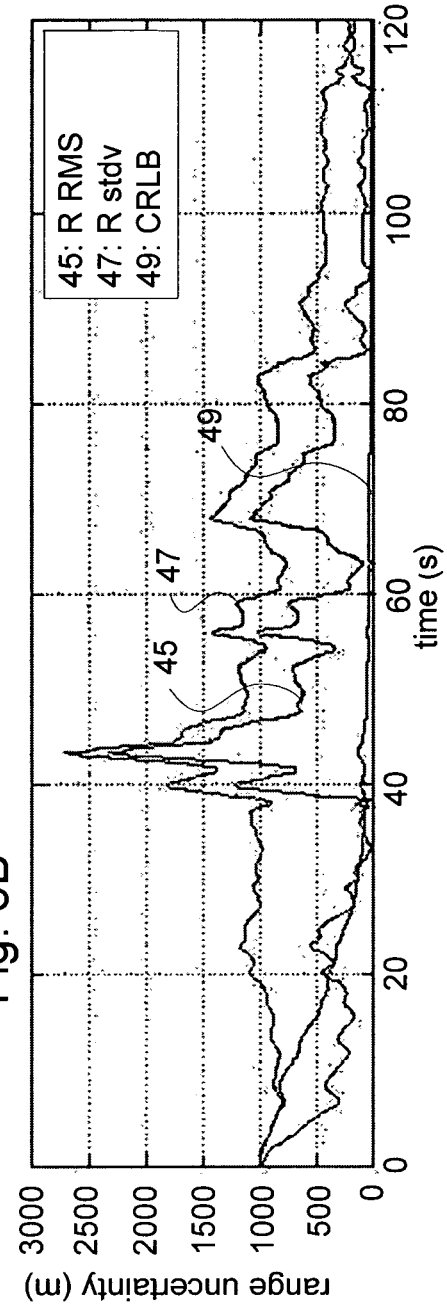
Fig. 6A
Fig. 6B

USING IMAGE SENSOR AND TRACKING FILTER TIME-TO-GO TO AVOID MID-AIR COLLISIONS

CROSS-REFERENCE TO RELATED APPLICATIONS

This application claims priority under 35 U.S.C. §119 to European patent application 08163084.0 filed 27 Aug. 2008 and is the national phase under 35 U.S.C. §371 of PCT/SE2009/050931 filed 12 Aug. 2009.

TECHNICAL FIELD

The present invention relates to the field of mid-air collision avoidance, and more particularly to a system and method for deciding whether or not an aerial vehicle should perform an autonomous avoidance manoeuvre in order to avoid collision with another aerial vehicle.

BACKGROUND ART

In order to allow unmanned aerial vehicles (UAVs) to travel in civil unsegregated airspace, several technical problems must be solved. One of the most important issues is the "sense & avoid" problem: a UAV must be able to sense the presence of other aerial vehicles and, if necessary, perform an autonomous and safe last instant manoeuvre to avoid mid-air collision. Therefore, a UAV typically comprises an air collision avoidance system, sometimes also referred to as a Sense & Avoid system, including one or several sensors for sensing intruding aircraft, and collision avoidance functionality that uses the sensed data and the performance characteristics of the own aircraft to perform a safe escape manoeuvre. Since the collision avoidance system is a safety enhancing system it is crucial that the data supplied to the collision avoidance functionality are of high quality in order to avoid nuisance and unsafe maneuvers.

A crucial parameter in a collision avoidance system is the entity called Time To Collision (TTC) which, as the name implies, is the estimated time to impact with an intruding aircraft, calculated based on data regarding the own aircraft's position and motion and data on surrounding aerial vehicles, collected by the sensors of the collision avoidance system. The estimated TTC value is typically used to determine an entity sometimes called Time To Manoeuvre (TTM) which is an estimate of the time left before an escape manoeuvre must be performed in order to avoid a mid-air collision in a safe way. TTM is normally calculated as TTC minus a safety value, which safety value is determined based on, e.g., the performance characteristics of the own aircraft and the uncertainty associated with the estimated TTC value.

There are several known ways of estimating the time to collision with nearby aircrafts. For example, it is known to use cameras for capturing consecutive images of surrounding aircrafts such that the aircraft represent themselves as target points in the images, and estimate TTC based on the scale change in the target points from one image to another.

It is also well-known in the art to use different types of tracking filters adapted to estimate the time to collision with a nearby aircraft from a sequence of observations about the nearby aircraft's position, typically acquired by means of radar.

However, each of the above principles for estimating TTC suffer from drawbacks. The first principle according to which TTC estimates are calculated based on scale change in target points between consecutive images is only applicable when the intruding aircraft is very close to the own aircraft. The second principle according to which TTC estimates are estimated by a tracking filter suffers from the drawback that the uncertainty in the TTC estimates is high.

SUMMARY

It is an object of the present invention to provide a collision avoidance system which is able to predict the time to collision (TTC) between an aerial vehicle equipped with the system and an intruding aerial vehicle with a high degree of certainty.

It is another object of the invention to provide such a system offering a high availability of TTC estimates.

This object is achieved according to the invention by a collision avoidance system for deciding whether an autonomous avoidance manoeuvre should be performed in order to avoid a mid-air collision between a host aerial vehicle equipped with the system and an intruding aerial vehicle. The system comprises:

- at least one electro optical sensor arranged to capture consecutive images of said intruding vehicle, the vehicle of which manifests itself as a target point in said images,
- image processing means arranged to estimate at least the azimuth ($\phi$) and elevation ($\theta$) angle from the host vehicle to the intruding vehicle based on the 2D position of the target point in said images, and a first time-to-collision estimate ($TTC_{IPU}$) of the time to collision between the host vehicle and the intruding vehicle based on scale change in the target point between at least two of said consecutive images,
- a tracking filter arranged to estimate a second time-to-collision estimate ($TTC_{TF}$) of the time to collision between the host vehicle and the intruding vehicle using said estimated azimuth angle ($\phi$), said estimated elevation angle ($\theta$) and said first time-to-collision estimate ($TTC_{IPU}$) as input parameters, and
- collision avoidance (CA) means arranged to decide whether or not the avoidance manoeuvre should be performed based on any of at least one parameter, of which at least one is indicative of said second time-to-collision estimate ($TTC_{TF}$).

By using the $TTC_{IPU}$ estimates as input parameters to the tracking filter, the present invention provides a collision avoidance system benefitting from both the advantage offered by conventional tracking filters (TTC estimates available even when the target is far distant) and the advantage offered by conventional image sensors using scale correlation techniques (high degree of certainty in TTC estimates when the target is nearby).

An advantage of running the $TTC_{IPU}$ estimates through the tracking filter instead of simply using $TTC_{TF}$ estimates from the tracking filter at long distances and $TTC_{IPU}$ estimates from the image processing units at short distances, is that the use of the $TTC_{IPU}$ estimates as input parameters to the filter has a positive impact not only on the $TTC_{TF}$ estimates outputted by the filter but also the other state parameters of the filter model. For example, a tracking filter is typically designed to estimate the distance to the intruding vehicle in order to establish the three-dimensional position thereof. By providing the $TTC_{IPU}$ estimates as input to filter, both the distance estimation and the distance uncertainty estimation computed by the filter can be substantially improved.

The time to manoeuvre (TTM), i.e. the time left until an avoidance manoeuvre must be performed in order to avoid collision, is typically calculated based on a plurality of parameters, of which the TTC estimate and its associated uncertainty are two very important ones. The present invention thus provides for a more robust collision avoidance system where the number of avoidance manoeuvres performed without due cause can be minimized since the principle of using $TTC_{IPU}$ estimates from the image processing unit as input parameters to the tracking filter reduces the uncertainty in the $TTC_{TF}$ estimates outputted by the filter.

Preferably, the tracking filter of the collision avoidance system is arranged to estimate the uncertainty in the $TTC_{TF}$ estimate, whereby the CA means is arranged to make the decision as to whether or not the collision avoidance manoeuvre should be performed based on both the $TTC_{TF}$ estimate and its associated uncertainty.

According to another embodiment of the invention, the CA means is arranged to make the decision as to whether or not the collision avoidance manoeuvre should be performed based on either or both of a parameter indicative of the $TTC_{TF}$ estimate outputted by the tracking filter and a parameter indicative of $TTC_{IPU}$ estimate made by the image processing means. Preferably, the CA means is, in this case, arranged to compare the $TTC_{TF}$ estimate with the $TTC_{IPU}$ estimate and make the decision based on the estimate indicating the shortest time to collision. This adds another layer of safety to the collision avoidance system according to the invention.

In a refined version of the above embodiment, the collision avoidance system comprises means for estimating both the uncertainty in the $TTC_{TF}$ estimate and the uncertainty in the $TTC_{IPU}$ estimate, whereby the CA means is arranged to make the decision based on any of the $TTC_{TF}$ estimate, the $TTC_{TF}$ uncertainty estimate, the $TTC_{IPU}$ estimate, the $TTC_{IPU}$ uncertainty estimate or any combination of these. Thereby, the CA means can, for example, calculate a first TTM based on the $TTC_{TF}$ estimate and its associated uncertainty, and a second TTM based on the $TTC_{IPU}$ estimate and its associated uncertainty, and base the decision as to whether or not the collision avoidance manoeuvre should be performed on the shortest of the so calculated TTMs.

The uncertainty in the $TTC_{IPU}$ estimates is typically high as long as the intruding vehicle is far distant to the host vehicle. Preferably, the tracking filter of the collision avoidance system is arranged to start using the $TTC_{IPU}$ estimates as input parameters when the quality in the $TTC_{IPU}$ estimates exceeds a certain threshold value. The quality of the $TTC_{IPU}$ estimates can be determined by studying various quality indicating parameters, such as e.g. the uncertainty in the $TTC_{IPU}$ estimate. The uncertainty of each $TTC_{IPU}$ estimate can be calculated in different ways but is preferably calculated based on the variance of the latest estimated $TTC_{IPU}$ estimates.

More advantageous features of the collision avoidance system according to the invention will be described in the detailed description following hereinafter.

It is another object of the present invention to provide a method for deciding whether an avoidance manoeuvre should be performed in order to avoid a mid-air collision between a host aerial vehicle and an intruding aerial vehicle.

This object is achieved by a method comprising the steps of:
  capturing consecutive images of said intruding vehicle, the vehicle of which manifests itself as a target point in said images,
  estimating at least the azimuth ($\phi$) and elevation ($\theta$) angle from the host vehicle to the intruding vehicle based on the 2D position of the target point in said images, and a first time-to-collision estimate ($TTC_{IPU}$) of the time to collision between the host vehicle and the intruding vehicle based on scale change in the target point between at least two of said consecutive images,
  estimating, by means of a tracking filter, a second time-to-collision estimate ($TTC_{TF}$) of the time to collision between the host vehicle and the intruding vehicle by using said estimated azimuth angle ($\phi$), said estimated elevation angle ($\theta$) and said first time-to-collision estimate ($TTC_{IPU}$) as input parameters to said filter, and
  deciding whether or not the avoidance manoeuvre should be performed based on any of at least one parameter, of which at least one is indicative of said second time-to-collision estimate ($TTC_{TF}$).

BRIEF DESCRIPTION OF THE DRAWINGS

The present invention will become more fully understood from the detailed description provided hereinafter and the accompanying drawings, which are not necessarily to scale, and are given by way of illustration only. In the different drawings, same reference numerals correspond to the same element.

FIGS. 4 to 8B show graphs of real flight data, recorded during a scenario in which an intruding aircraft approached a host aircraft equipped with the collision avoidance system illustrated in FIG. 2.

ACRONYMS AND ABBREVIATIONS

| Acronym | Definition |
| --- | --- |
| ADS-B | Automatic Dependent Surveillance-Broadcast |
| EKF | Extended Kalman Filter |
| IPU | Image Processing Unit |
| LIDAR | Light Detection and Ranging |
| MSC | Modified Spherical Coordinates |
| SNR | Signal-to-Noise Ratio |
| TP | Tracking Prediction |
| TS | Tracking System |
| TTC | Time-To-Collision |
| TTM | Time-To-Manoeuvre |
| UAV | Unmanned Aerial Vehicle |
| UKF | Unscented Kalman Filter |

DETAILED DESCRIPTION

Figure 1:
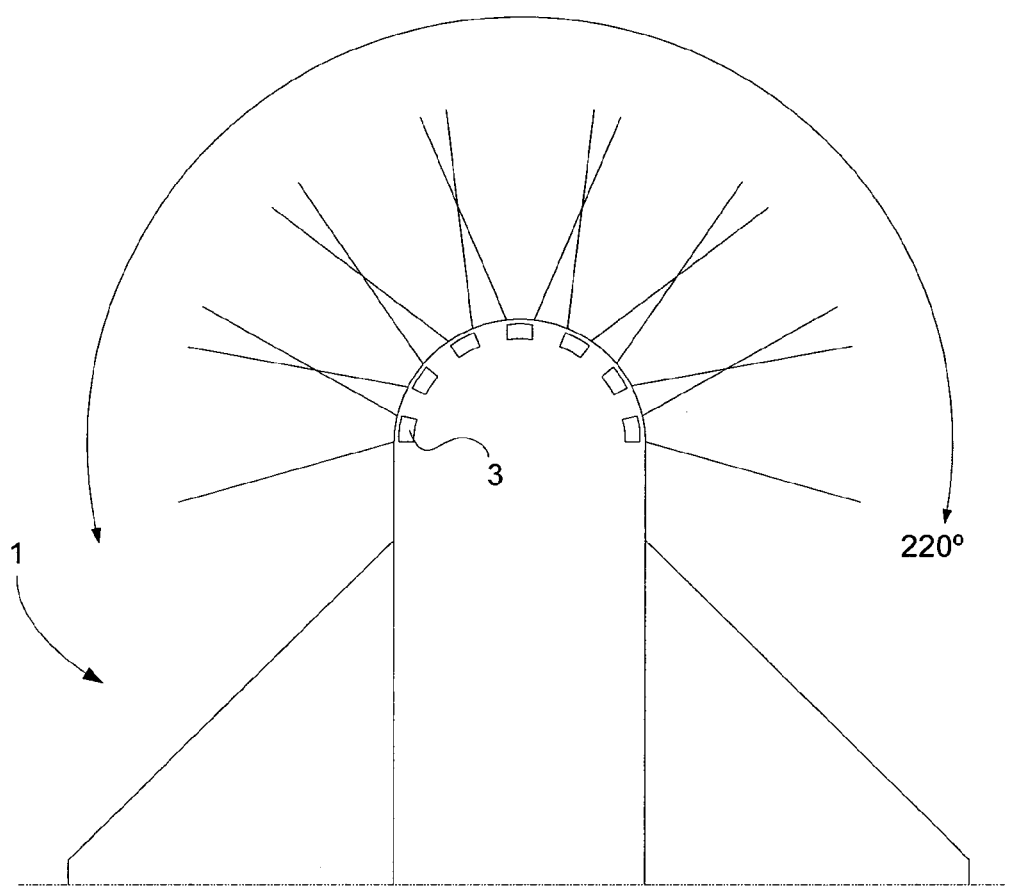
FIG. 1 illustrates a top view of the front half of an Unmanned Aerial Vehicle 1 comprising a collision avoidance system according to the invention.

FIG. 1 illustrates a top view of the front half of an Unmanned Aerial Vehicle (UAV) 1. The UAV 1 comprises one or several electro-optical (EO) sensors 3 for monitoring surrounding air traffic. The EO sensors 3 constitute parts of a tracking system for continuously tracking nearby airborne objects in order to avoid midair collisions. The collision avoidance system of which the tracking system forms a part will be described in more detail below with reference to FIG. 2.

In the exemplary embodiment illustrated in FIG. 1, the UAV 1 is seen to comprise seven electro-optical (EO) sensors 3 which are arranged in a semi-circular pattern on or close to the nose of the UAV 1. The EO sensors 3 may be any devices which are able to capture consecutive images of objects in the surrounding airspace. In one embodiment of the invention, the EO sensors 3 are 9 Hz video cameras 3 capturing images having a 2048×2048 pixel resolution. That is, each camera 3 captures nine high-resolution images of the surrounding airspace every second. Each camera 3 has a field of view of 35 degrees in azimuth and 30 degrees in elevation. The fields of view of two adjacent cameras 3 are overlapping slightly in azimuth, resulting in a total field of view of 220 degrees in azimuth for the entire EO sensor arrangement. The EO sensor arrangement thus has a field of view of 220 degrees in azimuth and 30 degrees in elevation, which substantially corresponds to the field of view of the human eyes.

Figure 2:
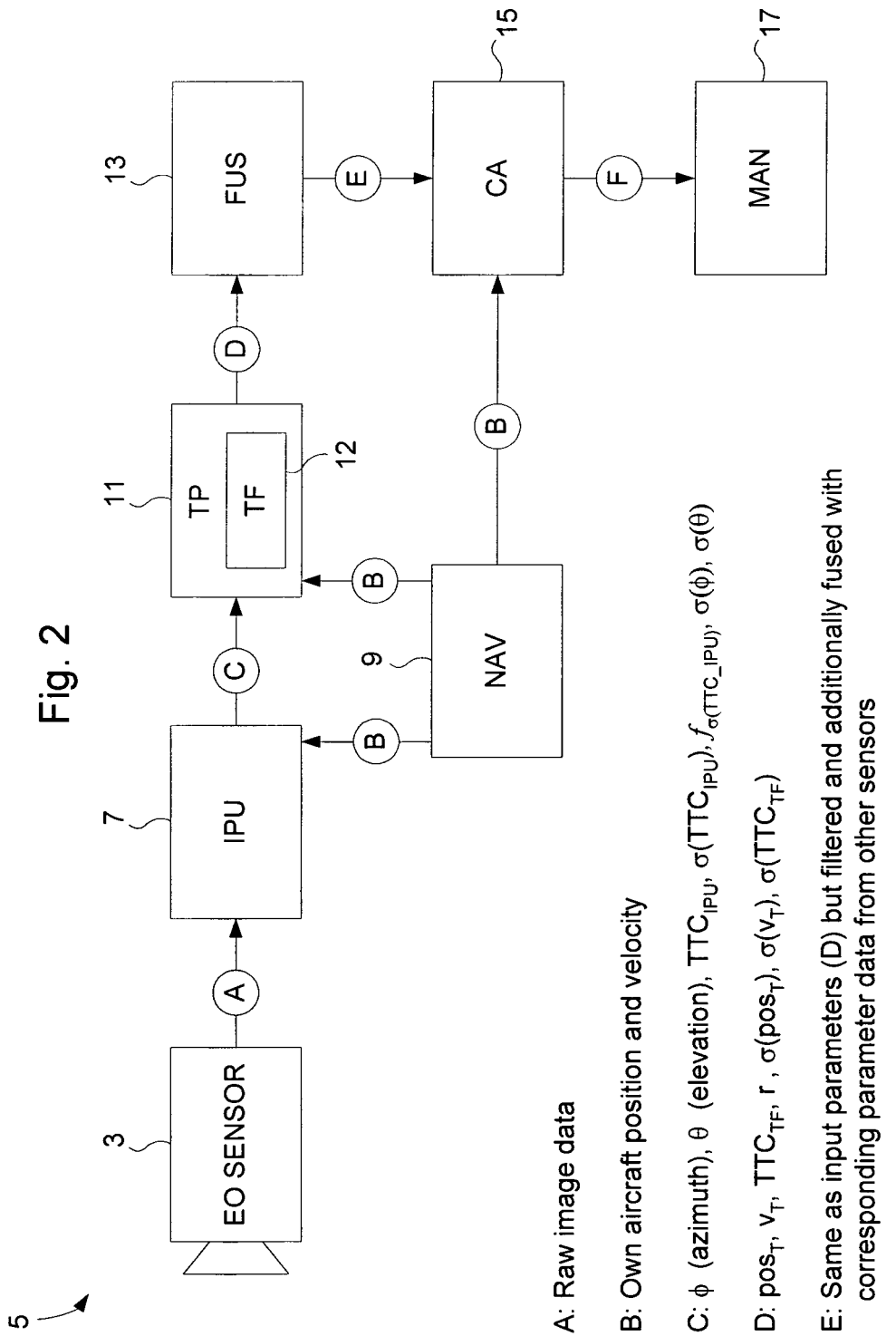
FIG. 2 illustrates a collision avoidance system for midair collision avoidance applications according to an embodiment of the present invention.

FIG. 2 illustrates a collision avoidance system 5 for midair collision avoidance applications according to an embodiment of the invention.

Each of the EO sensors 3 in FIG. 1 is connected to an image processing unit (IPU) 7 to which they transmit the captured image data.

The IPU 7 filters and processes the received image data to detect pixel discrepancies which are representative of nearby aerial vehicles. An aerial vehicle entering the field of view of any of the cameras 3 of the tracking system 5 will manifest itself as a substantially point-shaped object filling one or several image pixels. A detected pixel discrepancy representing an aerial vehicle will hereinafter be referred to as a target point and the aerial vehicle manifesting itself as a target point in the image will be referred to as a target.

A well-known problem in target tracking systems based on image recognition is to separate real target points from pixel discrepancies caused by signal noise. Typically, in a 2048×2048 pixel image, there will be hundreds of "fake" target points caused by signal noise. In order to filter out those fake target points, the IPU 7 is adapted to compare two or more consecutive images received from the camera 3 and associate the target points occurring in the different images with each other when sufficiently similar. In this context, "sufficiently similar" typically means that target points having substantially the same size, occurring in substantially the same place, and moving in substantially the same direction between the consecutive images are associated with each other. Of course, the IPU 7 is adapted to tolerate small changes in size, position and direction of motion between the consecutive images to compensate for any relative motion between the host UAV 1 and the tracked target manifesting itself as a target point in the images. For this purpose, the IPU 7 may be adapted to use navigational data relating to own aircraft position and velocity, received from a navigational unit 9. The IPU 7 is further adapted to associate an associated target point with a track along which the target point moves between the consecutive images, and estimate the position of a particular target point in the following image or images based on this track. Target points that cannot be associated with target points occurring in previous or later images are considered fake and filtered out by the IPU 7.

The IPU 7 is further adapted to estimate at least three parameters of interest, and the uncertainty associated with each parameter.

First, the IPU 7 is adapted to estimate the azimuth, $\phi$, and elevation, $\theta$, of each detected target based on the two-dimensional (2D) position of the target point representing that target in the processed image. As each camera 3 is arranged in a known way in relation to the UAV 1 body, and as the field of view of each camera, i.e. the solid angle monitored by each camera, is known and well-defined, the IPU 7 can translate the 2D position of the pixel(s) constituting the target point in the captured image to an azimuth angle, $\phi$, and an elevation angle, $\theta$, from the UAV 1 to the target. The azimuth, $\phi$, and elevation, $\theta$, together gives the bearing from the UAV 1 to the target. The IPU 7 is also adapted to estimate the uncertainty, $\sigma(\phi)$, in the azimuth estimation and the uncertainty, $\sigma(\theta)$, in the elevation estimation based on, e.g., the signal-to-noise ratio (SNR) in the processed image and other performance-critical system parameters. Furthermore, the IPU 7 may be arranged to determine quality parameters, $p(\theta)$ and $p(\phi)$, which are indicative of the availability and the quality of the azimuth, $\phi$, and elevation, $\theta$, estimations. The quality of the azimuth and elevation estimations depends on, e.g., the measuring method used and the performance characteristics of the measurement equipment. Quality parameters indicating the degree of accuracy in measured data is often desired in safety critical applications, such as collision avoidance applications. The uncertainty parameters $\sigma(\phi)$ and $\sigma(\theta)$ and the quality parameters $p(\phi)$ and $p(\theta)$ together constitute a good measure of the reliability of the measured bearing from the host UAV 1 to a tracked aerial vehicle.

Secondly, the IPU 7 is adapted to estimate a parameter called Time-To-Collision (TTC), which parameter is of great importance in collision avoidance applications. As the name implies, TTC is a measure of the predicted time to collision between the host UAV 1 and the detected target. Although the image data received by the IPU 7 contains no explicit information about the distance to a detected target or the velocity thereof, the IPU 7 is able to estimate TTC using scale correlation image processing techniques. TTC estimates estimated by the IPU 7 using scale correlation image processing techniques will hereinafter be denoted $TTC_{IPU}$.

Figure 3:
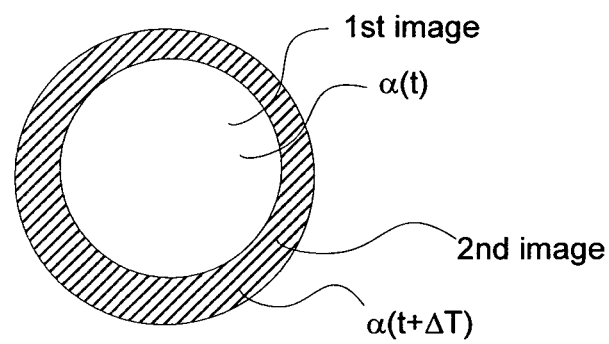
FIG. 3 illustrates two target points representing the same target in two consecutive images captured by one of the electro-optical sensors in the collision avoidance system in FIG. 2.

In order to estimate $TTC_{IPU}$, the IPU 7 is adapted to measure the scale change of a projected target between consecutive images, i.e. the scale change of a target point between consecutive images, and estimate $TTC_{IPU}$ based on said scale change. The scale change of a target point between consecutive images, or, in other words, the rate of change of angular growth in the target point, is equal to a measurement of the distance to the tracked target divided by the target's closing speed and is hence a measure of the time to collision between the host UAV 1 and the tracked target. FIG. 3 illustrates two target points representing the same target in two consecutive images captured by the camera 3. The first image is captured at a first point in time, t, at which the angular extent of the target point on the sensor is denoted $\alpha(t)$, and the second image is captured at a second point in time, $t+\Delta T$, at which the angular extent of the target point, $\alpha(t+\Delta T)$, is slightly bigger due to the fact that the target has gotten closer to the host UAV 1 during the time period $\Delta T$. The dashed area represents the change in angular growth of the target point between the two images. By measuring the dashed area using image processing techniques, the IPU 7 can calculate the target point's rate of change of angular growth since the time, $\Delta T$, elapsed between the capturing of the different images is known. Typically, the angular extent of a target point is estimated by measuring the linear extent of the target point in the image, i.e. by measuring the width and/or the height of the target point.

It should be noted that in order for the IPU 7 to obtain an accurate estimate of $TTC_{IPU}$, the target must be moving substantially directly towards the host UAV 1. That is, the change in bearing ($|d\phi/dt|$ and $|d\theta/dt|$) to the tracked target should be close to zero over time. This is due to the fact that, in order for the IPU 7 to determine the scale change of the target point and hence the $TTC_{IPU}$ with a reasonable degree of certainty, the target points should preferably overlap each other entirely, as illustrated in FIG. 3. Furthermore, in order to obtain a high certainty in the $TTC_{IPU}$ estimation, the scale change of the target point must be sufficiently big between the consecutive images. "Consecutive images" should in this context not necessarily be interpreted as two immediately consecutive images. In the exemplary embodiment in which 9 Hz video cameras 3 are used as DO sensors, using two immediate consecutive images when trying to estimate $TTC_{IPU}$ would yield a ΔT of approximately 0.2 seconds. A ΔT value of 0.2 seconds is normally to small when tracking far distant aerial vehicles having a standard size and velocity. With the suggested EO sensor setup, ΔT is preferably chosen to be between 2 and 10 seconds (corresponding to determining the scale change of the target point between at maximum every eighteenth image and at minimum every ninetieth image).

A problem with using scale change in target points between consecutive images for estimating time to collision is that the estimates only are available when the intruding aerial vehicle is close to the EO sensors 3 and hence the host UAV 1. The critical distance at which $TTC_{IPU}$ estimates become available depends on the visibility, the relative closing speed of the vehicles, EO sensor properties and the size of the intruding aerial vehicle. That $TTC_{IPU}$ estimates become "available" here means that beyond this critical distance, any $TTC_{IPU}$ estimate is much too uncertain to be relied upon. However, an advantage of estimating time to collision based on scale change in target points between consecutively captured images is that once the intruding aerial vehicle is within the above mentioned critical distance, the estimated $TTC_{IPU}$ values have a very high degree of certainty.

Besides the uncertainties associated with the azimuth and elevation estimations, $\sigma(\phi)$ and $\sigma(\theta)$, the IPU 7 is further adapted to estimate the uncertainty, $\sigma(TTC_{IPU})$, associated with the $TTC_{IPU}$ estimation. The $TTC_{IPU}$ uncertainty may be estimated in many different ways. For example, it can be calculated based on various system parameters, such as SNR and angular measurement noise on an image-to-image-basis. Typically, however, the uncertainty associated with a particular $TTC_{IPU}$ estimate is determined by the IPU 7 by studying the variance of a plurality of $TTC_{IPU}$ values estimated immediately before the $TTC_{IPU}$ estimate of which uncertainty is to be determined. A good correspondence/small variance indicates that the $TTC_{IPU}$ estimate is reliable. The IPU 7 may further be adapted to generate a $TTC_{IPU}$ uncertainty indicator, $f_{\sigma(TTC\_IPU)}$, that is indicative of the uncertainty, $\sigma(TTC_{IPU})$, associated with each $TTC_{IPU}$ estimate and hence the reliability thereof. The $TTC_{IPU}$ uncertainty indicator may be, e.g., a flag which is set by the IPU 7 when the $TTC_{IPU}$ uncertainty falls below a predetermined threshold value.

Turning again to FIG. 2, the tracking system 5 further comprises tracking prediction (TP) means 11. The tracking predictor 11 comprises a tracking filter 12, for estimating the time to collision with intruding aerial vehicles based on the bearing measurements, i.e. the azimuth, $\phi$, and elevation, $\theta$, measurements, made by the IPU 7. Time to collision estimates estimated by the tracking filter 12 will hereinafter be denoted $TTC_{TF}$.

Tracking filters are well known in the art and can be implemented in many different ways. For example, the tracking filter 12 may be an Extended Kalman Filter (EKF), an Unscented Kalman Filter (UKF), variations of particle filters (Recursive Monte Carlo methods) or combinations thereof. Both Kalman filters and particle filters are well known in the art and known to be efficient recursive filters for estimating the state of a dynamic system from a series of measurements. It is also known to use such filters in tracking predictors for estimating the position and velocity of a nearby aerial vehicle from a sequence of observations about the vehicle's position.

As indicated in FIG. 2, the tracking predictor 11 receives the angular measurements ($\phi$ and $\theta$) and the uncertainties associated therewith ($\sigma(\phi)$ and $\sigma(\theta)$) from the IPU 7. It also receives navigational data relating to the own aircraft 1, such as current attitude, speed, direction of motion, acceleration etc., from navigation unit 9. This data is used as input parameters to the tracking filter 12 in order for said filter to estimate the three-dimensional (3D) position ($pos_T$) of the target, the velocity ($v_T$) of the target, $TTC_{TF}$, and the uncertainties associated with these parameters.

An advantage of using tracking filters for estimating time to collision, as compared to using scale correlation techniques as the one used by IPU 7 explained above, is that $TTC_{TF}$ estimates can be obtained also when the tracked target is far distant from the UAV 1. $TTC_{TF}$ estimates for an intruding aerial vehicle can be calculated by the tracking filter 12 at distances much longer than the critical distance from which reliable $TTC_{IPU}$ estimates are derivable by the IPU 7. A disadvantage of estimating time to collision using a tracking filter instead of using the scale change technique described above is, however, that the uncertainties in the $TTC_{TF}$ estimates are much higher than the uncertainties in the $TTC_{IPU}$ estimates for short-distance measurements, i.e. for distances shorter than said critical distance. That is, while $TTC_{TF}$ estimates of an intruding aerial vehicle often are available as soon as the vehicle is detectable by the EO sensors 3, $TTC_{IPU}$ estimates are much more certain when the vehicle is close to the host UAV 1.

The basic concept of the present invention is to use the $TTC_{IPU}$ estimates estimated by the IPU 7 as input parameters to the tracking filter 12 when the $TTC_{IPU}$ estimates are considered sufficiently reliable, and allow the decision as to whether or not the UAV 1 should perform an autonomous collision avoidance manoeuvre to be based on the $TTC_{TF}$ estimates outputted by the tracking filter 12, or any parameter related thereto. By using the $TTC_{IPU}$ estimates as measured input parameters to the tracking filter 12, the uncertainty in the $TTC_{TF}$ estimates outputted by the filter 12 is dramatically reduced. Furthermore, both the estimate of the distance to the target and the distance uncertainty is improved. Thus, a more accurate and certain estimate of the 3D position of the target can be obtained.

Below, an exemplary implementation of the invention will be described. In this exemplary implementation, the tracking filter 12 is an EKF 12 using Modified Spherical Coordinates (MSC). Nevertheless, it should be appreciated that the basic concept of using the $TTC_{IPU}$ estimates as input parameters to the tracking filter 12 in order to increase the accuracy and reduce the uncertainty in the $TTC_{TF}$ estimates are applicable also when other types of tracking filters are used.

In MSC-coordinates, $TTC_{TF}$ can be directly inferred by the tracking filter 12 if the bearing rate ($|d\phi/dt|$ and $|d\theta/dt|$) and the bearing acceleration ($|d^2\phi/dt^2|$ and $|d^2\theta/dt^2|$) are both non-zero. In practice, the relative movement between the host UAV 1 and an intruding aerial vehicle is never uniform due to, e.g., small but ubiquitous changes in wind force, and, therefore, these conditions are always fulfilled and the EKF 12 always able to estimate the time to collision with a detected target.

In this exemplary implementation, the state vector estimated by the EKF 12 using MSC coordinates is:

$$x = \left\{\phi, \dot{\phi}\cos(\theta), \theta, \dot{\theta}, \frac{\dot{r}}{r}, \frac{1}{r}\right\} \quad (1)$$

where φ is the azimuth and θ the elevation from the host UAV 1 to the tracked target, $\dot{\phi}$ and $\dot{\theta}$ are the rates of change in azimuth and elevation, respectively, r is the distance from the host UAV 1 to the tracked target, and $\dot{r}$ is the rate of change in said distance, i.e. the relative closing speed of the host UAV 1 and the tracked target. It should be noted that the fifth state, $\dot{r}/r$, is the relative closing speed of the host UAV 1 and the tracked target divided by the distance there between, and hence is the inverse of $TTC_{TF}$.

Initially, when a far distant target first is detected by an EO sensor 3, the azimuth angle, φ, the elevation angle, θ, and the uncertainties associated therewith, σ(φ) and σ(θ), are calculated by the IPU 7 and provided to the TP 11 in which they are used as input values to the EKF 12. The initial values of the other states of the state vector, x, are guessed. Typically, the rate of change in azimuth and elevation and hence the second and fourth state of the state vector, x, are initially set to zero. The initial values of the fifth and sixth states of the state vector, x, may be set to any suitable values. However, a preferred initial value of the parameter r is a value corresponding to the operative range of the EO sensors 1, since it is likely that a target that is detected for the first time by an EO sensor 1 is located close to the limit of the sensor's detection range. The detection range is dependent on the sensor, the size of the object (intruding aircraft), and the atmospheric conditions. An estimate of the size of the intruding aircraft can be achieved using knowledge of the flight zone. For example, small aircraft typically operate on low flight levels outside the range of the Air Traffic Management (ATM), whereas large commercial liners operate in controlled air-space on high altitudes. As regards the initial value of the fifth state, corresponding to the inverse of $TTC_{TF}$, a suitable initial $TTC_{TF}$ value can be guessed based on available data. Typically, an initial $TTC_{TF}$ value is calculated based on the assumption that the detected target and the host UAV 1 eventually will collide, the guessed distance to the target (i.e. the operative range of the EO sensors 1), the speed of the own aircraft 1, and guessed closing speed between the own aircraft and the target.

As well known in the art, the tracking filter 12 then estimates new values for the state parameters and the uncertainties associated therewith, based on the above initial values and the azimuth and elevation measurements received from the IPU 7. In the following iterations, the filter 12 uses the values of the state parameters estimated in the previous time step and the latest azimuth and elevation estimations made by the IPU 7 to compute new state parameter values and uncertainties.

As previously mentioned, the uncertainties in the $TTC_{IPU}$ estimates from the IPU 7 are typically high at long distances. However, if the distance between the tracked target and the host UAV 1 becomes sufficiently small, the $TTC_{IPU}$ estimates become much more certain than the $TTC_{TF}$ estimates. Since a collision avoidance manoeuvre by nature is performed when an intruding aircraft is close to the UAV 1, reliable $TTC_{IPU}$ estimates will be available in the collision avoidance system 5 at the time the need for performing an avoidance manoeuvre arises.

Typically, the collision avoidance system 5 is arranged such that the tracking filter 12 starts to use the $TTC_{IPU}$ estimates from the IPU 7 as input parameters when they have reached a certain degree of reliability. For example, the TP 11 may be arranged to receive the $TTC_{IPU}$ uncertainty indicator, $f_{\sigma(TCC\_IPU)}$, from the IPU 7, and to provide the $TTC_{IPU}$ estimates as input parameters to the tracking filter 12 when the TTC uncertainty indicator indicates that the uncertainty, σ($TCC_{IPU}$), in the $TTC_{IPU}$ estimates has fallen below a certain threshold value. However, it should be understood that the uncertainty in the $TTC_{IPU}$ estimates is not the only parameter indicating the reliability thereof and that other quality parameters also may be used to determine when the filter 12 should start use the $TTC_{IPU}$ estimates as input parameters.

The tracking filter 12 can be designed to use reliable $TTC_{IPU}$ estimates received from the IPU 7 in different ways. Preferably, the tracking filter 12 is adapted to fuse the $TTC_{IPU}$ estimates from the IPU 7 with the $TTC_{TF}$ estimates outputted by the filter 12, meaning that each $TTC_{IPU}$ estimate is used as additional input parameter to the filter, complementing the $TTC_{TF}$ estimate estimated by the filter itself in the previous iteration (i.e. the inverse of the fifth state in the state vector, x). That is, the $TTC_{IPU}$ estimates are considered as a measured state parameter by the tracking filter 12. Thus, according to this embodiment the $TTC_{IPU}$ is used as an input measurement by the tracking filter 12, which yields an estimate of $TTC_{TF}$ with an improved estimate of the uncertainty of both $TTC_{TF}$ and other states.

The proposed collision avoidance system 5 in which $TTC_{IPU}$ estimates from the IPU 7 are used as input parameters to the tracking filter 12 when said $TTC_{IPU}$ estimates become reliable combines the advantages offered by tracking filters (time-to-collision estimates available also for far distant targets) and image sensors using scale correlation techniques (high degree of certainty in time-to-collision estimates for close targets). An advantage of running the $TTC_{IPU}$ estimates through the tracking filter 12 instead of simply using $TTC_{TF}$ estimates from the tracking filter 12 at long distances and $TTC_{IPU}$ estimates from the IPU 7 at short distances, is that also the estimate of the distance, r, to the target, and hence the estimate of the 3D position of the target, is improved. This is due to the fact that the high degree of certainty in the $TTC_{TF}$ estimate offered by the proposed principle has a direct impact on the accuracy and certainty in the range estimation.

As previously mentioned, the critical distance at which $TTC_{IPU}$ becomes available depends on the visibility, the relative closing speed of the vehicles, EO sensor properties and the size of the intruding aerial vehicle. In fact, an estimate of the effective distance at which $TTC_{IPU}$ estimates become sufficiently reliable to use as input parameters to the tracking filter 12 can be derived by considering the SNR:

$$SNR = E(\alpha/d\alpha/dt)/\text{Stdv}(\alpha/d\alpha/dt) \quad (2)$$

where E is the estimation operator, α is the angular extent of the target point on the sensor, and Stdv is the standard deviation operator of the TTC estimate. This yields:

$$T_{TTC} = \sqrt{\frac{L\Delta T}{vSNR\sigma_a\sqrt{2}}} \quad (3)$$

where $T_{TTC}$ is the time left to collision at the point in time at which $TTC_{IPU}$ estimates from the IPU 7 become available (i.e. the real time to collision minus the time left until reliable $TTC_{IPU}$ estimates from the IPU become available), L is the linear size of the tracked target, ΔT is an integration time corresponding to the time between two immediate consecutive images taken by the EO sensors 1, v is the closing speed between the host UAV 1 and the tracked target, and SNR is the signal-to-noise ratio and $\sigma_\alpha$ is the angular measurement noise.

Besides the EO sensors 1, the IPU 7, the navigation unit 9 and the TP 11, the collision avoidance system 5 in FIG. 2 is further seen to comprise an optional data fusion unit 13. The data fusion unit 13 can be connected to other sensors (not shown) of the collision avoidance system 5, such as primary and/or secondary radar, LIDAR, ADS-B equipment etc., and be arranged to fuse the data received from any such sensor(s) with the data outputted by the tracking filter 11.

The data outputted by the tracking filter 12 are then provided as input data to a collision avoidance (CA) unit 15, optionally after being fused with data collected from other sensors in the fusion unit 13. The CA unit 15 comprises functionality for evaluating the received data in order to determine if, and if so, how a collision avoidance manoeuvre should be performed by the UAV 1 in order to avoid collision with the tracked target. This decision may be based not only on said received data but also on navigational data relating to own aircraft location and motion, provided to the CA unit 15 by the navigation unit 9. Typically, it is also based on the flight performance of the UAV 1. If the CA unit 15 determines that now is the time to make an avoidance manoeuvre in order to avoid collision with an intruding aerial vehicle, it sends UAV control commands to a UAV manoeuvring unit 17, instructing the manoeuvring unit 17 to control the UAV 1 in accordance with said control commands.

According to the invention, the collision avoidance system 5 is designed such that the decision as to whether or not an avoidance manoeuvre should be performed can be based at least on the $TTC_{TF}$ estimate outputted by the tracking filter 12, or any parameter indicative of said $TTC_{TF}$ estimate. For example, the decision can be based on the $TTC_{TF}$ estimate itself, and the uncertainty associated therewith. Typically, the collision avoidance unit 15 is arranged to calculate the time left until a last instant avoidance manoeuvre must be initiated, hereinafter referred to as the time to manoeuvre (TTM), based on a plurality of parameters, of which the $TTC_{TF}$ estimate and its associated uncertainty are two of the most important ones. Thus, the proposed principle of using the $TTC_{IPU}$ values estimated by the IPU 7 as input parameters to the tracking filter 12 provides for a more robust and safe collision avoidance functionality with fewer calls for unnecessary avoidance manoeuvres as the uncertainty in the $TTC_{TF}$ parameter iterated by the tracking filter 12 becomes dramatically reduced.

According to another embodiment of the invention, the collision avoidance system 5 is designed such that the CA unit 15 receives also the $TTC_{IPU}$ estimates estimated by the IPU 7, and the uncertainties associated therewith. In this embodiment the CA unit 15 is arranged to decide whether or not an avoidance manoeuvre should be performed based on either or both of the $TTC_{TF}$ estimates and the $TTC_{IPU}$ estimates. In this case, the CA unit 15 can be arranged to compare a received $TTC_{TF}$ estimate with a simultaneously received $TTC_{IPU}$ estimate and decide whether or not to initiate an avoidance manoeuvre based on the estimate indicating the smallest TTC. Thereby, yet another layer of safety is added to the collision avoidance system 5. Preferably, the CA unit 15 is arranged not only to consider the $TTC_{TF}$ and $TTC_{IPU}$ estimates when taking the decision, but also the uncertainty associated with each respective estimate. For example, the CA unit 15 can be arranged to calculate a first TTM based on the $TTC_{TF}$ estimate and its associated uncertainty, and a second TTM based on the $TTC_{IPU}$ estimate and its associated uncertainty, and base the decision as to whether or not the collision avoidance manoeuvre should be performed on the shortest of the so calculated TTMs.

It should thus be understood that the collision avoidance unit 15 can be arranged to base the decision as to whether or not an avoidance manoeuvre should be performed on any of a plurality of parameters, of which at least one is the $TTC_{TF}$ estimate outputted by the tracking filter 12, which tracking filter is arranged to use the $TTC_{IPU}$ estimates as input parameters. By allowing the decision to be based on $TTC_{TF}$ estimates estimated in accordance with the principle proposed herein, a robust and safe collision avoidance system 5 is provided.

Although always able to, the CA unit 15 does not need to make the decision as to whether or not the avoidance manoeuvre should be performed based on the $TTC_{TF}$ estimates. As described above, examples of other parameters on which the decision can be based are the $TTC_{IPU}$ estimates as directly inferred by the IPU 7, and the uncertainties associated with the $TTC_{TF}$ and $TTC_{IPU}$ estimates. Other parameters estimated by the IPU 7 or the tracking filter 12, such as the uncertainties in the azimuth, elevation and range estimate, or the quality parameters $p(\theta)$ and $p(\phi)$ indicating the quality and availability of azimuth and elevation estimates, may also be used in the decision making process. That is, the collision avoidance system 5 is designed such that the CA unit 15 always can make the decision based on the $TTC_{TF}$ estimates outputted by the tracking filter 12, but may also, under certain circumstances in which other parameters are considered more important or reliable, chose to make the decision based on these parameter values alone or in combination with the value of the $TTC_{TF}$ estimate.

In a refined embodiment of the invention, the CA unit 15 comprises a separate selection means (not shown) that determines which parameter or parameters should be used in the decision as to whether or not an avoidance manoeuvre should be performed. The selection means can then be arranged to analyze all the parameters available in the collision avoidance system 5 and decide on which parameter(s) the decision should be based given the current parameter values.

FIGS. 4 to 8B show graphs of real flight data, recorded during a scenario in which a "chaser" aircraft and the own aircraft flew at approximately 100 m/s, approaching each other with a closure speed of approximately 30 m/s. The tracking filter 12 used when recording the flight data was an EKF using MSC coordinates. The state vector of the dynamic model used by the filter 12 was the state vector, x, above. In the exemplary implementation of the tracking filter 12 used in this test, the $TTC_{TF}$ estimates were estimated by the filter 12 using the $TTC_{IPU}$ measurements in the state estimation when the uncertainty thereof fell below a certain threshold value. The measurement noise was set to (standard deviation) 1 mrad, process noise to 1, and the variance of 1/TTC to 0,0001. The estimated time from detection of the target by the EO sensors 1 to the point in time at which TTC estimates are available from the IPU 7 can, as mentioned above, be derived using equation (3). With SNR~10, v (relative closing speed) ~30 m/s, $\sigma_\alpha$~1E-4 rad, $\Delta T$~10 s, and L~10 m, the value of $T_{TTC}$ can be calculated to ~48 s.

Figure 4:
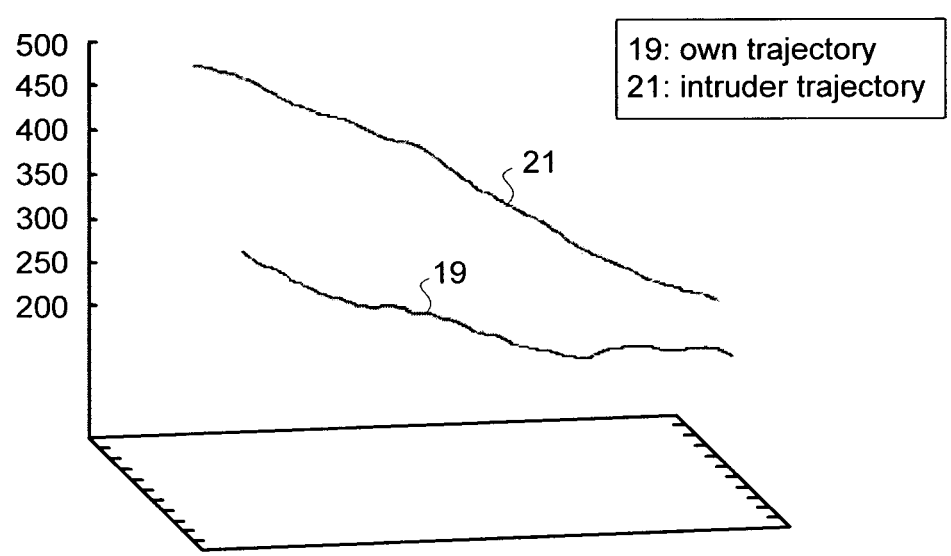

FIG. 4 illustrates the own-ship trajectory 19 and the intruding aircraft's trajectory 21 during 120 seconds, plotted in RT 90 which is a local (Swedish), right-angled, planar, Cartesian coordinate system. The Y-axis indicates the altitude in meters above an altitude of reference.

FIGS. 5A and 5B show the $TTC_{TF}$ and $TTC_{TF}$ error estimated by the tracking filter 12 when no $TTC_{IPU}$ estimate from the IPU 7 was used as input parameters to the filter. In FIG.

5A, line 23 illustrates true time to collision, $TTC_{GPS}$, which time to collision was determined based on GPS data (known positions and velocities of both aircraft). Line 25 illustrates the time to collision, $TTC_{TF}$, estimated by the tracking filter. Line 29 illustrates $TTC_{TF}$ minus one times the standard deviation, and line 31 illustrates $TTC_{TF}$ plus one times the standard deviation. In FIG. 5B, line 33 illustrates the root mean square (RMS) error of $TTC_{TF}$ and line 35 the standard deviation for the $TTC_{TF}$ data.

FIGS. 6A and 6B show the range to the intruding aircraft and the range error estimated by the tracking filter 12 when no $TTC_{IPU}$ estimates from the IPU 7 was used as input parameters to the filter. In FIG. 6A, line 37 illustrates true range, $R_{GPS}$, which range was determined based on GPS data (known positions and velocities of both aircraft). Line 39 illustrates the range, $R_{TF}$, estimated by the tracking filter. Line 41 illustrates $R_{TF}$ minus one times the standard deviation, and line 43 illustrates $R_{TF}$ plus one times the standard deviation. In FIG. 6B, line 45 illustrates the RMS error of $R_{TF}$ and line 47 the standard deviation for the $R_{TF}$ data. Line 49 illustrates an approximation of the parametric Cramer-Rao lower bound.

Figure 7A:
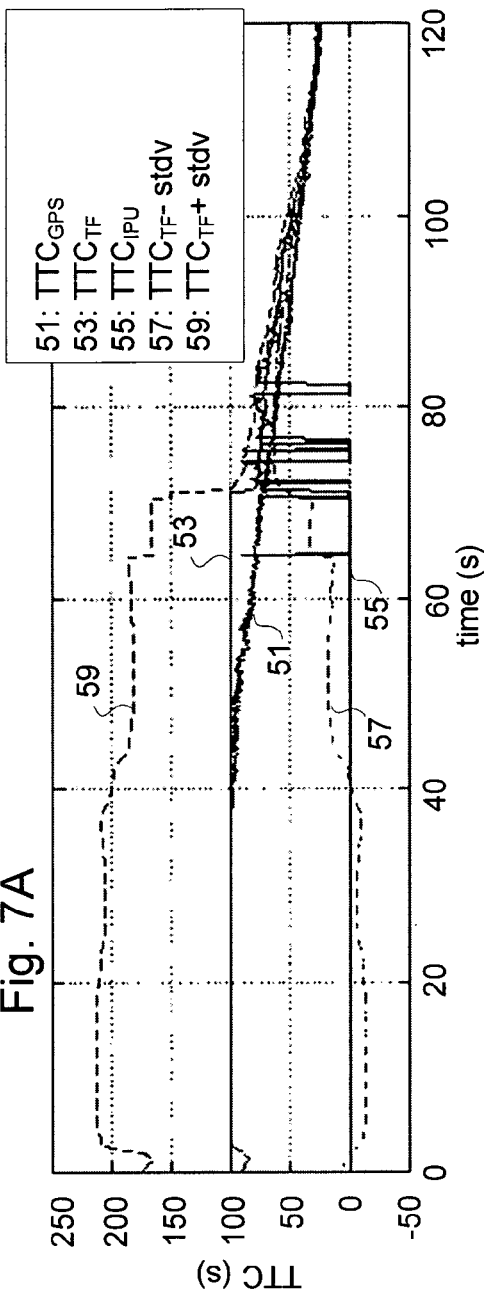
Figure 7B:
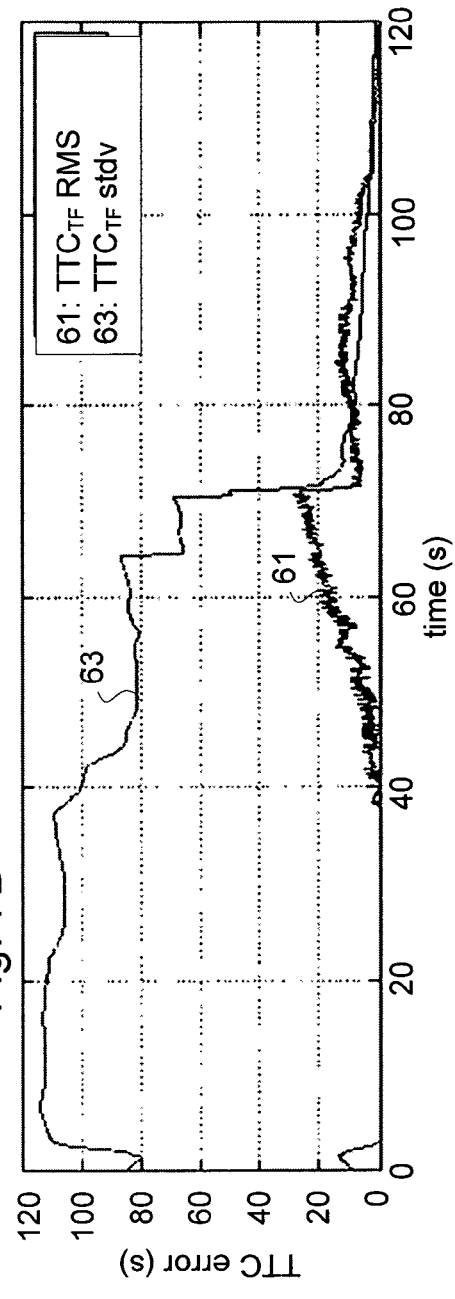

FIGS. 7A and 7B show the $TTC_{TF}$ and $TTC_{TF}$ error estimated by the tracking filter 12 when $TTC_{IPU}$ estimates from the IPU 7 were used as input parameters to the filter when available. In FIG. 7A, line 51 corresponds to line 23 in FIG. 5A and thus illustrates true time to collision, $TTC_{GPS}$, as calculated using GPS data (known positions and velocities of both aircraft). Line 53 illustrates the $TTC_{TF}$ estimated by the tracking filter 12 using the $TTC_{IPU}$ estimates. Line 55 illustrates the $TTC_{IPU}$ estimates estimated by the IPU 7 when the quality thereof was sufficiently high. Line 57 illustrates $TTC_{TF}$ minus one times the standard deviation, and line 59 illustrates $TTC_{TF}$ plus one times the standard deviation.

Figure 8A:
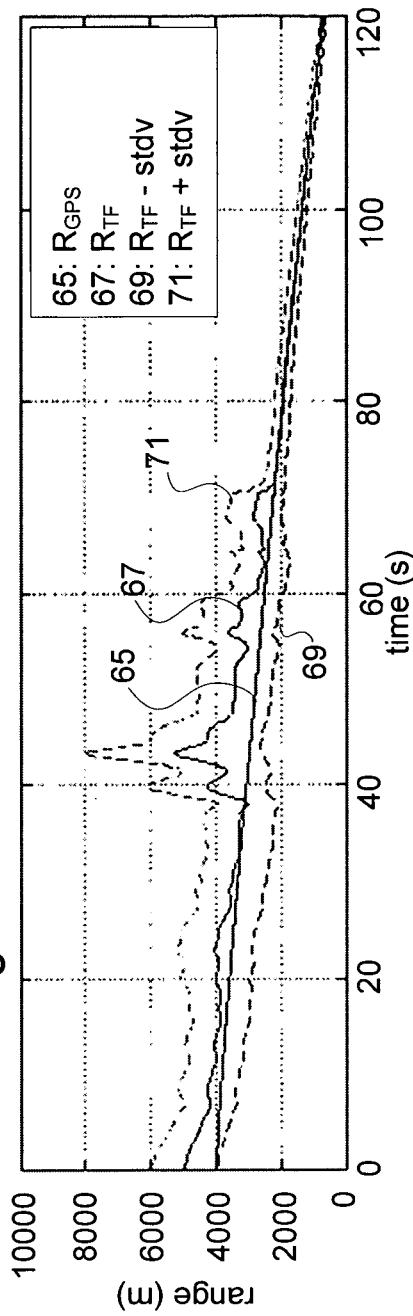
Figure 8B:
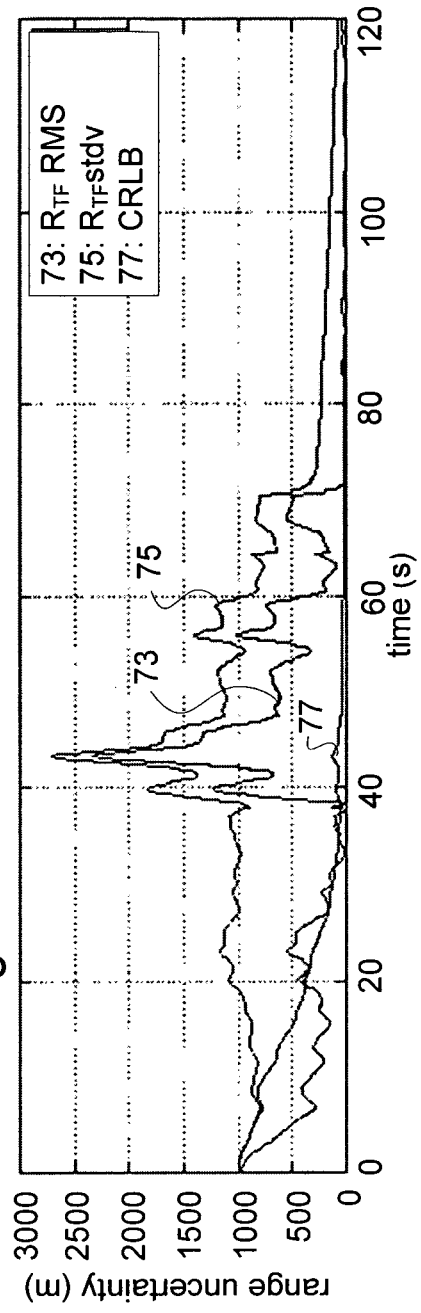

FIGS. 8A and 8B show the range to the intruding aircraft and the range error estimated by the tracking filter 12 when $TTC_{IPU}$ estimates from the IPU 7 were used as input parameters to the filter when available. In FIG. 8A, line 65 corresponds to line 37 in FIG. 6A and thus illustrates true range, $R_{GPS}$, as calculated using GPS data (known positions and velocities of both aircraft). Line 67 illustrates the range, $R_{TF}$, estimated by the tracking filter using the $TTC_{IPU}$ estimates. Line 69 illustrates $R_{TF}$ minus one times the standard deviation, and line 71 illustrates $R_{TF}$ plus one times the standard deviation. In FIG. 8B, line 73 illustrates the RMS error of $R_{TF}$ and line 75 the standard deviation for the $R_{TF}$ data. Line 77 illustrates an approximation of the parametric Cramer-Rao lower bound.

When comparing the graphs illustrated in FIGS. 5A-B and 6A-B with the graphs illustrated in FIGS. 7A-B and 8A-B, the benefits of the present invention become clear. When comparing FIG. 5A with FIG. 7A, it is clear that the $TTC_{TF}$ estimates outputted by the tracking filter 12 are getting much closer to the true time to collision, $TTC_{GPS}$, when $TTC_{IPU}$ estimates from the IPU 7 are used as input to the filter. From FIGS. 5B and 7B it can also be seen that the RMS error in the $TTC_{TF}$ estimation is substantially reduced when having the filter 12 use the $TTC_{IPU}$ estimates from the IPU 7 as input parameters. When comparing FIG. 6A with FIG. 8A, and FIG. 6B with FIG. 8B, it can further be seen that the range estimation, $R_{TF}$, becomes much more accurate when the filter 12 uses the $TTC_{IPU}$ estimates and that the uncertainty in the range estimation is substantially reduced.

Figure 9:
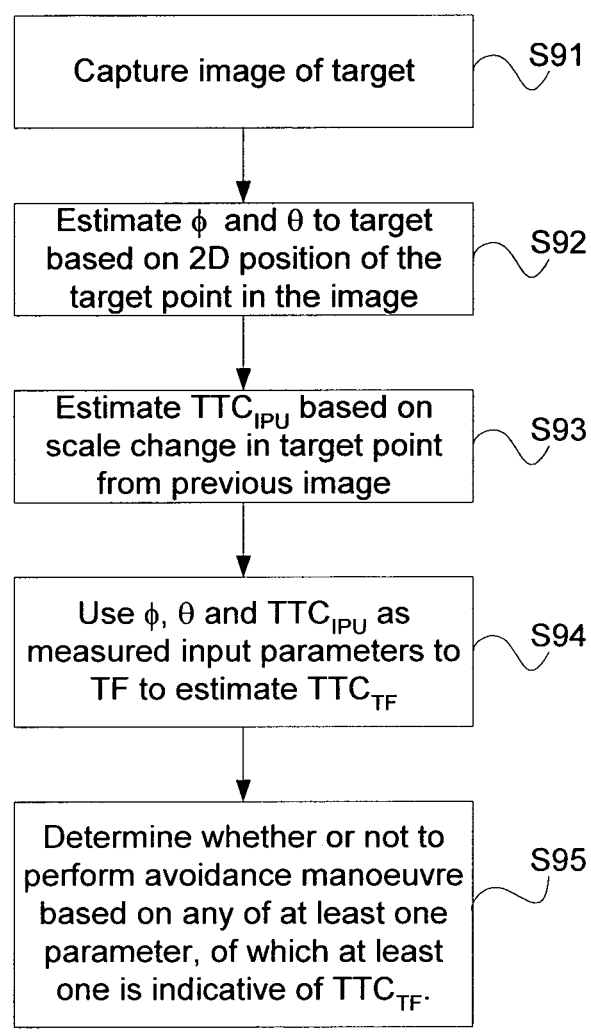
FIG. 9 is a flowchart illustrating a method for deciding whether an avoidance manoeuvre should be performed in order to avoid a mid-air collision between a host aerial vehicle and an intruding aerial vehicle.

From FIG. 7A, it can be seen that, under these particular circumstances and with this exemplary implementation of the collision avoidance system 5, $TTC_{IPU}$ estimates estimated by the IPU 7 become sufficiently reliable to be used as input parameters to the tracking filter 12 approximately 60 seconds after the intruding aircraft has been detected by the EO sensors 3. This tallies relatively well with the estimation made using equation (3) above, according to which $TTC_{IPU}$ estimates would be available after approximately 48 seconds.

deciding whether an avoidance manoeuvre should be performed in order to avoid a mid-air collision between a host aerial vehicle (1) and an intruding aerial vehicle In FIG. 9, a flowchart illustrating a method for deciding whether an avoidance manoeuvre should be performed in order to avoid a mid-air collision between a host aerial vehicle 1 and an intruding aerial vehicle. The following steps are performed according to the method:

S91: An image of the target is captured by an EO sensor 3. The target manifests itself as a target point in the image.

S92: The azimuth ($\phi$) and elevation angles ($\theta$) from the host UAV 1 to the tracked target are estimated by the IPU 7 based on the 2D position of the target point in the image.

S93: A first estimate ($TTC_{IPU}$) of the time to collision between the host UAV 1 and the tracked target is estimated by the IPU 7 based on the scale change in the target point between the captured image and one or several previously captured images.

S94: A second estimate ($TTC_{TF}$) of the time to collision between the host UAV 1 and the tracked target is estimated by the tracking filter 12 by using the azimuth angle ($\phi$), the elevation angle ($\theta$) and first time-to-collision estimate ($TTC_{IPU}$) estimated by the IPU 7 in steps S92 and S93 as input parameters.

S95: A decision as to whether or not a collision avoidance manoeuvre should be performed is made based on any of at least one parameter, of which at least one parameter is indicative of the second time-to-collision estimate ($TTC_{TF}$) estimated in step S94.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the scope of the invention as set forth in the appended claims.

It is therefore contemplated that the claims will cover any such modifications or embodiments that fall within the true scope of the invention.

The invention claimed is:

1. A collision avoidance system in a host aerial vehicle for deciding whether an autonomous avoidance manoeuvre should be performed in order to avoid a mid-air collision between the host aerial vehicle equipped with the system and an intruding aerial vehicle, said system comprising:

at least one electro optical sensor arranged to capture consecutive images of said intruding vehicle, wherein the intruding vehicle is manifested as a target point in said images, an image processor arranged to estimate at least an azimuth and an elevation angle from the host vehicle to the intruding vehicle based on a 2D position of the target point in said images, and a first time-to-collision estimate of a time to collision between the host vehicle and the intruding vehicle based on a scale change in the target point between at least two of said consecutive images, a tracking filter arranged to estimate a second time-to-collision estimate of the time to collision between the host vehicle and the intruding vehicle using said estimated azimuth angle, said estimated elevation angle and said first time-to-collision estimate as input parameters, a collision avoidance module arranged to make a decision whether or not the avoidance manoeuvre should be performed based on any of at least one decision parameter, of which at least one is indicative of said second time-to-collision estimate, an uncertainty determining module configured to determine an uncertainty in the first time-to-collision estimate, and a timing module configured to determine to start using said first time-to-collision estimate as input parameter to said tracking filter when said uncertainty falls below a predetermined threshold.

2. The collision avoidance system according to claim 1, wherein said tracking filter further is arranged to estimate an uncertainty in said second time-to-collision estimate, and wherein said collision avoidance module is arranged to make the decision based on said second time-to-collision estimate and said uncertainty.

3. The collision avoidance system according to claim 1, wherein said collision avoidance module is arranged to make the decision based on at least one of a parameter indicative of said second time-to-collision estimate or a parameter indicative of said first time-to-collision estimate.

4. The collision avoidance system according to claim 3, further comprising:

an uncertainty determining module configured to determine an uncertainty in the first time-to-collision estimate, said collision avoidance module being arranged to make the decision based on at least one of the second time-to-collision estimate, the second time-to-collision estimate uncertainty, the first time-to-collision estimate, or the first time-to-collision estimate uncertainty.

5. The collision avoidance system according to claim 1, wherein the collision avoidance module further comprises a selection module configured to analyze at least one of at least one parameter available from sensor measurements or estimates in the collision avoidance system, and select on which at least one parameter the decision as to whether or not the avoidance manoeuvre should be performed should be based, based on a value of the at least one analyzed parameter.

6. The collision avoidance system according to claim 1, wherein said tracking filter is arranged to, in each filter iteration, use both the first time-to-collision estimate estimated by the image processor from a latest captured image and the second time-to-collision estimate estimated by the filter in a preceding filter iteration as input parameters when estimating said second time-to-collision estimate.

7. The collision avoidance system according to claim 1, wherein said tracking filter is an Extended Kalman Filter.

8. The collision avoidance system according to claim 1, wherein said tracking filter is an Unscented Kalman Filter.

9. The collision avoidance system according to claim 1, wherein said tracking filter is a particle filter.

10. A method in a host aerial vehicle for deciding whether an avoidance manoeuvre should be performed in order to avoid a mid-air collision between the host aerial vehicle and an intruding aerial vehicle, said method comprising:

capturing consecutive images of said intruding vehicle, wherein the intruding vehicle is manifested as a target point in said images, estimating at least an azimuth and an elevation angle from the host vehicle to the intruding vehicle based on a 2D position of the target point in said images, and a first time-to-collision estimate of a time to collision between the host vehicle and the intruding vehicle based on a scale change in the target point between at least two of said consecutive images, estimating, utilizing a tracking filter, a second time-to-collision estimate of the time to collision between the host vehicle and the intruding vehicle by using said estimated azimuth angle, said estimated elevation angle and said first time-to-collision estimate as input parameters to said filter, deciding whether or not the avoidance manoeuvre should be performed based on any of at least one decision parameter, of which at least one is indicative of said second time-to-collision estimate, estimating an uncertainty in said first time-to-collision estimate, and starting use of the first time-to-collision estimates as the input parameter to the tracking filter when the uncertainty falls below a predetermined threshold.

11. The method according to claim 10, further comprising:

estimating an uncertainty in said second time-to-collision estimate, and deciding whether or not the avoidance manoeuvre should be performed based on said second time-to-collision estimate and said uncertainty.

12. The method according to claim 10, wherein deciding whether or not the avoidance manoeuvre should be performed is based on at least one of a parameter indicative of said second time-to-collision estimate and a parameter indicative of said first time-to-collision estimate.

13. The method according to claim 12, further comprising:

estimating an uncertainty in said first time-to-collision estimate, deciding whether or not the avoidance manoeuvre should be performed being based on at least one of the second time-to-collision estimate, the second time-to-collision estimate uncertainty, the first time-to-collision estimate, or the first time-to-collision estimate uncertainty.

* * * * *